Figure 1:
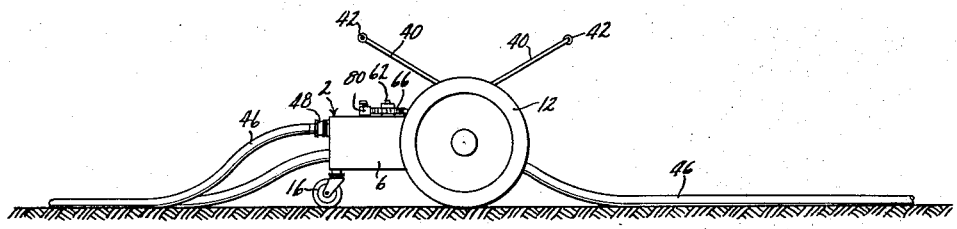

Sept. 22, 1959 H. R. KELTNER 2,905,392
TRAVELLING LAWN SPRINKLER
Filed Dec. 16, 1955 2 Sheets-Sheet 1

INVENTOR.
Hugh R. Keltner
BY
Hamilton + Hamilton
Attorneys.

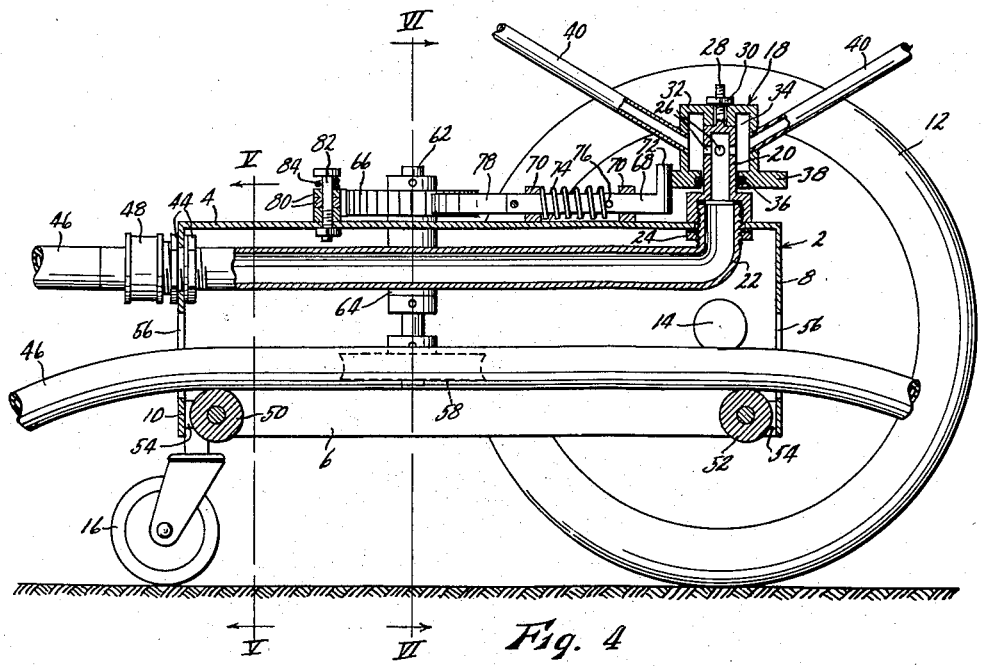
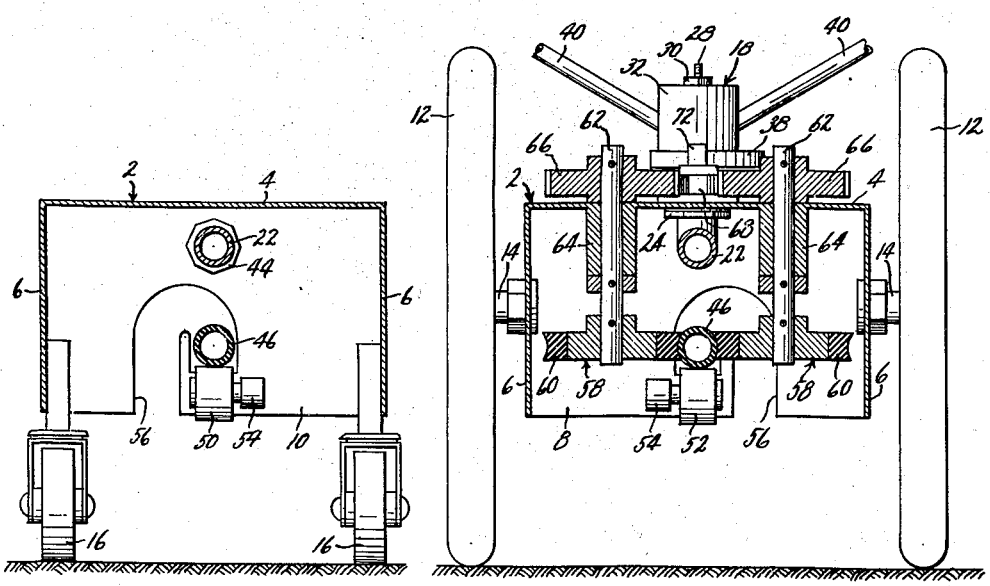
Fig. 4
Fig. 5   Fig. 6
INVENTOR.
Hugh R. Keltner
BY
Hamilton & Hamilton
Attorneys.

United States Patent Office 2,905,392
Patented Sept. 22, 1959

2,905,392

TRAVELLING LAWN SPRINKLER

Hugh R. Keltner, Johnson County, Kans.

Application December 16, 1955, Serial No. 553,453

1 Claim. (Cl. 239—110)

This invention relates to new and useful improvements in lawn sprinklers, and has as its principal object the provision of a lawn sprinkler comprising a sprinkler head mounted on a wheeled frame and attached to a pressure water supply, and having means operable by the pressure of the supply water to propel said wheeled frame over the ground.

Another object is the provision in a lawn sprinkler of the character described wherein the sprinkler head rotates to distribute water evenly over a wide area, and wherein said propelling means operates mechanically from the rotation of said head.

A further object is the provision of a lawn sprinkler of the class described wherein said propelling means operates by traction on an elongated member, which may be the water supply hose, laid out on the ground. The frame is steerable, so as to follow the elongated member around curves.

Other objects are simplicity and economy of construction, efficiency and dependability of operation, and adaptability for uses other than the watering of lawns.

Figure 2:
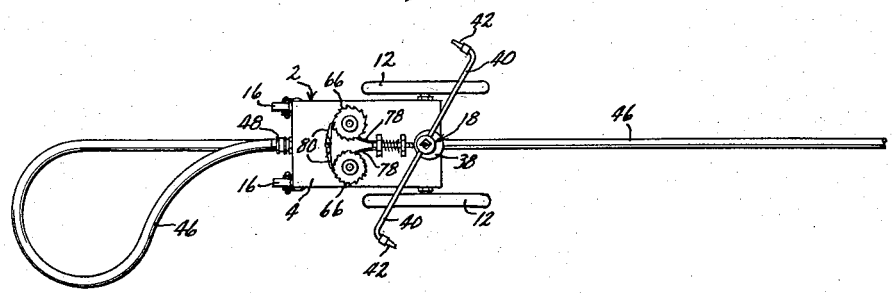
Figure 3:
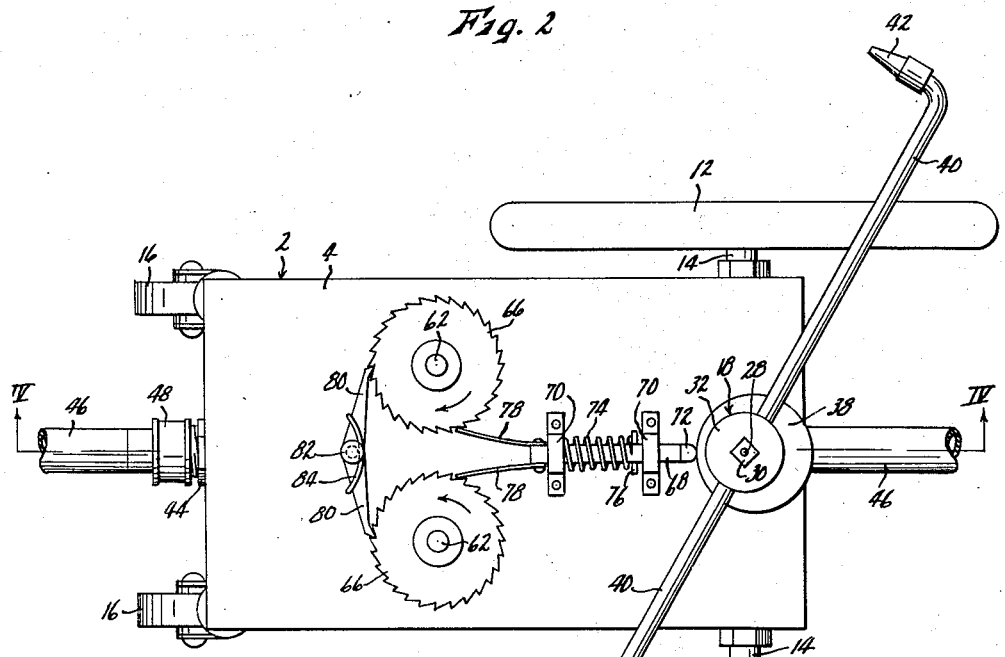

With these objects in view, as well as other objects which will appear in the course of the specification, reference will be had to the drawing, wherein:

Fig. 1 is a side elevational view of a lawn sprinkler embodying the present invention, shown in operative relationship to a water supply hose, Fig. 2 is a plan view of the parts as shown in Fig. 1, Fig. 3 is an enlarged plan view of the sprinkler, Fig. 4 is a sectional view taken on line IV—IV of Fig. 3, and Figs. 5 and 6 are sectional views taken respectively on lines V—V and VI—VI of Fig. 4.

Like reference numerals apply to similar parts throughout the several views, and the numeral 2 applies to a frame formed of sheet metal and having generally the form of a hollow rectilinear box. It has a top wall 4 and depending side walls 6, front wall 8, and rear wall 10, and is open at the bottom. It is supported at each of its forward corners by a ground-engaging wheel 12 rotatably mounted on a stub axle 14 fixed in the adjacent side wall 6, and at each of its rearward corners by a caster wheel 16, whereby the frame is rendered steerable.

Carried on top wall 4 of the frame, adjacent the forward edge thereof, is a sprinkler head 18. As best shown in Fig. 4, said sprinkler head includes a vertical tubular body member 20 closed at its upper end and threaded at its lower end to a pipe 22, extending upwardly through said wall. Said body and pipe are fixed relative to the frame by a nut 24 threaded on said pipe below wall 4. Body member 20 is provided adjacent its upper end with a plurality of apertures 26, and at its upper end with a threaded axial extension 28. Mounted rotatably on said extension, and secured thereon by nut 30, is an inverted cup-shaped member 32 the depending skirt of which is disposed concentrically about body 20, and is of larger diameter than said body member whereby to form a chamber 34 therebetween. At its lower end, member 32 is provided with a sealing ring 36 which engages body member 20 to seal chamber 34, and with an external circular flange 38 which is disposed eccentrically to the axis of body member 20. Flange 38 serves as a cam as will be fully described below.

Fixed in the skirt portion of member 32, in communicating relation with chamber 34, are a plurality of upwardly and outwardly inclined tubes 40, at the outer end of each of which is mounted a nozzle 42. It will be noted in Figs. 2 and 3 that the nozzles are angled to direct streams of water substantially tangentially to the orbit of the nozzles, in the same relative angular direction. Hence when water under pressure is delivered to sprinkler head 18 through pipe 22, it passes outwardly through holes 26 of body 20 into chamber 34, and thence through tubes 40 to nozzles 42. The reactive force of the streams leaving the nozzles causes cup 32 of the head to rotate, this rotation being clockwise as shown although the direction of rotation is immaterial. This rotation distributes the water evenly over a relatively large ground area, and also causes rotation of cam flange 38, which operates the frame propelling mechanism to be described below.

Pipe 22 extends horizontally and rearwardly just below frame wall 4, and extends through rear wall 10, being secured therein by a pair of nuts 44. A flexible water supply hose 46 is secured to the outwardly extended end of said pipe by a suitable coupling 48. The hose is then looped as shown in Figs. 1 and 2 and passed beneath the frame 2 parallel to the line of travel thereof. The hose is then lifted from the ground and laid over a pair of rollers 50 and 52 carried rotatably at the inner face of rear wall 10 and front wall 8 respectively, said rollers being mounted on axles fixed to said frame walls by brackets 54. As best shown in Figs. 5 and 6, said rear and front frame walls are each provided with an inverted J-shaped notch 56 through which the hose may be moved transversely to engage the associated roller, and which serves to hold the hose centered over said roller.

Intermediate rollers 50 and 52, the hose is gripped between a pair of drive wheels 58, each of said wheels having a thick soft rubber facing 60 whereby to grip the hose frictionally. The drive wheel faces are concave whereby to conform closely to the hose. However, the wheel facings are sufficiently yieldable that the hose may be crowded therebetween. Each of the drive wheels is fixed on a vertical shaft 62 which extends upwardly through top frame wall 4 and is journalled in a bearing member 64 affixed to said frame wall. To the upper end of each of shafts 62, above wall 4, is affixed a ratchet wheel 66.

Ratchet wheels 66 are operated by a cam follower mechanism including a bar 68 disposed horizontally above frame wall 4 and carried slidably in a pair of brackets 70 fixed to said frame wall. Said bar is movable longitudinally along a line intersecting the axis of sprinkler head 18 and passing between ratchet wheels 66. It is provided at its forward end with an upright finger 72 which bears slidably against the rim of flange cam 38 of the sprinkler head, and which is urged yieldably against said cam by a coil spring 74 encircling bar 68. Said spring bears at one end against one of brackets 70, and at its opposite end against a pin 76 inserted transversely through bar 68. At its rearward end, a pair of leaf springs 78 are affixed to bar 68, and extend rearwardly therefrom. Said spings extend between ratchet wheels 66, and are tensioned outwardly so that each spring engages in the teeth of one of the ratchet wheels, as best shown in Fig. 3.

Thus it will be seen that as sprinkler head 18 rotates as previously described, cam 38 thereof will rotate and urge cam follower bar 68 rearwardly against spring 74, and leaf springs 78, acting as pawls, will turn ratchet wheels 66 in the direction indicated by the arrows in Fig. 3. The throw of cam 38 is such that the ratchet wheels will be turned one tooth for each revolution of the sprinkler head. The ratchet teeth, and the cam throw, may obviously be made much smaller than shown, in order to provide slower rotation of the ratchet wheels, but are enlarged somewhat in the drawing for clarity. Springs 18 are sufficiently stiff to function as pawls, but are also sufficiently flexible that they will be deflected transversely to ride over the ratchet teeth as the bar 68 is moved rearwardly by spring 74. The rotation of ratchet wheels 66 of course also turns drive wheels 58, and since the drive wheels are in frictional engagement with the hose, the frame is pulled forwardly along the hose. The hose may be laid out on the ground ahead of the sprinkler in any desired pattern, so long as any curves therein are of sufficiently large radius, and the frame will follow the hose. In this manner, even an irregularly shaped lawn may be watered thoroughly and evenly without necessity of attendance on the sprinkler.

It has been found that the work which must be performed by the frame in lifting the hose from the ground applies a braking force to the frame sufficient to prevent the frame from coasting forwardly by gravity, which could occur if the ratchet wheels overran the pawls 78, on any slope usually encountered in lawns. The ratchet wheels are secured against following pawls 78 on their retracting stroke, which could otherwise occur particularly on upslopes, by a pair of dogs 80 pivotally mounted on a bolt 82 fixed in frame wall 4 and engaging respectively the two ratchet wheels 66 (Fig. 3). Said dogs are urged yieldably into engagement with said ratchet wheels by a coil spring 84 disposed on bolt 82 and having its end portions extended to engage said dogs intermediate their ends.

Although I have shown and described a specific embodiment of my invention, it will be apparent that many minor changes of structure and operation could be made without departing from the spirit of the invention as defined by the scope of the appended claim.

What I claim as new and desire to protect by Letters Patent is:

A lawn sprinkler comprising a wheeled frame, a water motor including a head carried rotatably by said frame and sprinkler nozzles mounted on said head in radially spaced relation from the axis thereof and positioned to eject streams of water substantially tangentially to the orbit thereof, in the same relative angular direction, whereby the reactive force of water jets from said nozzles will cause rotation of said head, said head constituting the power output member of said water motor, means for attaching a water supply hose to said frame to deliver water to said nozzles, said hose being laid on the ground and passing beneath said frame, a pair of friction drive wheels carried by said frame and adapted to grip said hose therebetween, and a driving connection between asid head and said friction drive wheels, whereby said drive wheels are turned to draw said frame along said hose, said driving connection comprising a cam fixed eccentrically to and rotatable with said head, a cam follower carried by said frame for reciprocal movement and driven by said cam, a pair of pawls carried by said cam follower and a pair of ratchet wheels fixed to and rotatable with said drive wheels respectively, each of said pawls operatively engaging one of said ratchet wheels.

References Cited in the file of this patent

UNITED STATES PATENTS

| | | |
|---|---|---|
| 2,563,519 | Egly | Aug. 7, 1951 |
| 2,602,696 | Salatin | July 8, 1952 |
| 2,726,119 | Egly | Dec. 6, 1955 |
| 2,770,495 | Egly | Nov. 13, 1956 |
| 2,788,242 | Jepson | Apr. 9, 1957 |